United States Patent [19]

Suzuki

[11] Patent Number: 4,540,217
[45] Date of Patent: Sep. 10, 1985

[54] HEADREST DEVICE FOR A VEHICLE SEAT

[75] Inventor: Hiroshi Suzuki, Akishima, Japan

[73] Assignee: Tachikawa Spring Co., Ltd., Tokyo, Japan

[21] Appl. No.: 522,585

[22] Filed: Aug. 12, 1983

[30] Foreign Application Priority Data

Aug. 13, 1982 [JP] Japan .................. 57-140685

[51] Int. Cl.³ .................................. A47C 7/36
[52] U.S. Cl. ...................... 297/391; 297/406
[58] Field of Search .......... 297/391, 410, 406, 407, 297/409, 383, 400, 399, 397; 188/77 W, 83; 74/104, 107

[56] References Cited

U.S. PATENT DOCUMENTS

| | | | |
|---|---|---|---|
| 1,443,703 | 1/1923 | Divelbiss | 188/77 W |
| 1,957,608 | 5/1934 | McCann | 297/409 |
| 2,581,321 | 1/1952 | Fletcher | 74/104 |
| 3,233,864 | 2/1966 | Behlen et al. | 74/104 |
| 3,405,791 | 10/1968 | Kaplan | 188/83 |
| 3,897,857 | 8/1975 | Rodaway | 188/77 W |
| 3,941,212 | 3/1976 | Lechner | 188/83 |
| 4,191,422 | 3/1980 | Inasawa et al. | 297/391 |
| 4,257,497 | 3/1981 | Schroeder | 788/77 W |
| 4,265,482 | 5/1981 | Nishimura et al. | 297/391 |
| 4,304,439 | 12/1981 | Terada et al. | 297/391 |
| 4,351,563 | 9/1982 | Hattori | 297/391 |
| 4,378,706 | 4/1983 | Miyamoto | 74/104 |

FOREIGN PATENT DOCUMENTS 890296 8/1953 Fed. Rep. of Germany ........ 74/104

Primary Examiner—William E. Lyddane
Assistant Examiner—Mark W. Binder
Attorney, Agent, or Firm—Watson, Cole, Grindle & Watson

[57] ABSTRACT

A headrest device mountable to a stay extending from the top of a backrest of a vehicle seat includes (1) a stationary frame portion which includes two vertical plates having vertically-elongated openings therein and guide projections extending away from their outer sides, (2) a movable frame portion which includes two side panels and a central panel extending therebetween, each of the side panels including upper guide slots, lower guide slots and a hole therebetween, (3) a braking mechanism which includes an outer case connected to a side panel, an inner case therein and a coil spring having engagement portions at its opposite ends, the inner case defining two engagement edges and having an operating shaft and and actuating shaft, and (4) an eccentric cam mechanism for moving the movable frame portion relative to the stationary frame portion, and including two disc elements movable in respective elongated opening in the plates, a connecting tube and support arms, one support arm including a boss to which the operating shaft is connected.

8 Claims, 4 Drawing Figures

HEADREST DEVICE FOR A VEHICLE SEAT

BACKGROUND OF THE INVENTION

1. Field of the Invention

The present invention relates to a headrest device for a vehicle seat, and more particularly to a headrest device of the type which includes a headrest body which can be adjustably displaced in a forward or backward relationship with respect to the back of the vehicle seat.

2. The Prior Art

A hitherto known headrest device of the type which includes a headrest body whose position is adjustable in a forward or backward relationship relative to a seat back is typically constructed such that the headrest body, which is constructed to have an egg-shaped cross-sectional configuration, is pivotally supported at a position located eccentrically relative to the device, and includes a gearing mechanism arranged between the headrest body and the pivotal support portion. The gearing mechanism operates such that a gear on the headrest body is normally brought in meshing engagement with a gear on the pivotal support portion so that the angular position of the headrest body can be adjusted as required, i.e., by rotating a knob on the headrest body. This results in the headrest body being properly located relative to the seat back.

Although the headrest body of such a conventional headrest device can satisfactorily resist an impulsive load induced by a driver's head in the event of a collision, owing to the meshing gear connection between the headrest body and the pivotal support portion of the device, it has been found that such a headrest device has the drawback that a number of rotations of the knob are required in order to adjust the angular position of the headrest body, making it difficult to achieve a quick angular adjustment thereof. Another drawback of the conventional headrest device is that the point where the driver's head comes in contact with the headrest body varies in accordance with the inclination of the headrest body and thereby the geometrical configuration of the contact area varies correspondingly, resulting in an uncomfortable feeling for the driver.

SUMMARY OF THE INVENTION

The present invention was made with the object of providing an improved headrest device for a seat or the like means on a vehicle wherein the headrest body can move steplessly forward or rearward in a horizontal fashion when the seat back to which it is attached is generally vertically inclined and without any necessity for inclination of the headrest so that the contact plane of the driver's rear head portion with the headrest body is kept constant at all times.

To accomplish the above object a headrest device for a vehicle seat of the noted type is characterized in that a headrest body constituting an essential part of the headrest device comprises a stationary frame portion and a movable frame portion, the latter being operatively engaged to the former so as to move forward or backward along a straight line whose orientation is fixed relative to the latter, and an eccentric cam mechanism is connected between both the stationary frame portion and the movable frame portion, the eccentric cam mechanism being adapted to be rotated by means of a knob located outward of the headrest body via a braking mechanism so that the movable frame portion moves forward or backward along a straight line whose orientation is fixed relative to the stationary frame portion, whereby the headrest body is adjustably displaced forward or backward relative to the seat back.

Owing to the arrangement of the headrest device in the above-described manner, it is assured that the headrest body is steplessly displaced forward or backward depending on the geometrical configuration of a driver's body and his preference. Further, owing to the fact that the headrest body is displaced forward or backward along a straight line, it is assured that a driver's head is comfortably supported with the same part of the surface of the headrest body.

The invention will be better understood by reference to the attached drawings, taken in conjunction with the following description thereof.

DETAILED DESCRIPTION OF THE INVENTION

Figure 1:
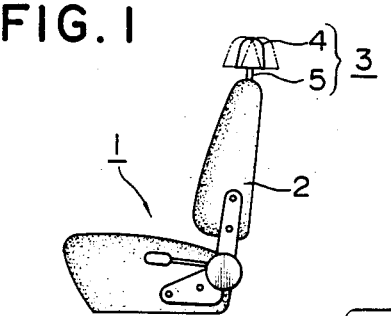
FIG. 1 is a schematic side view of a seat in a vehicle with a headrest device of the invention mounted thereto.

FIG. 1 schematically illustrates a vehicle seat 1 which includes a seat back 2, the seat back 2 mounting on its upper end a headrest device 3 constructed in accordance with the present invention. The headrest device 3 includes a headrest body 4 and a stay 5, the stay 5 being movably mounted on the upper end of the seat back 2.

Figure 3:
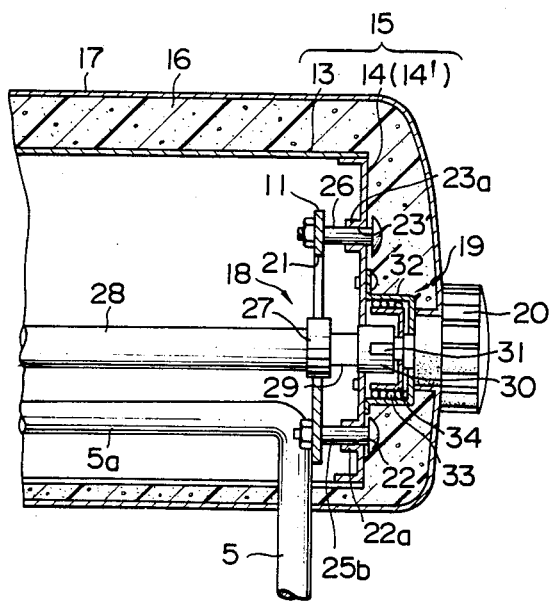
FIG. 3 is a sectional front view of the headrest device of the invention.
Figure 4:
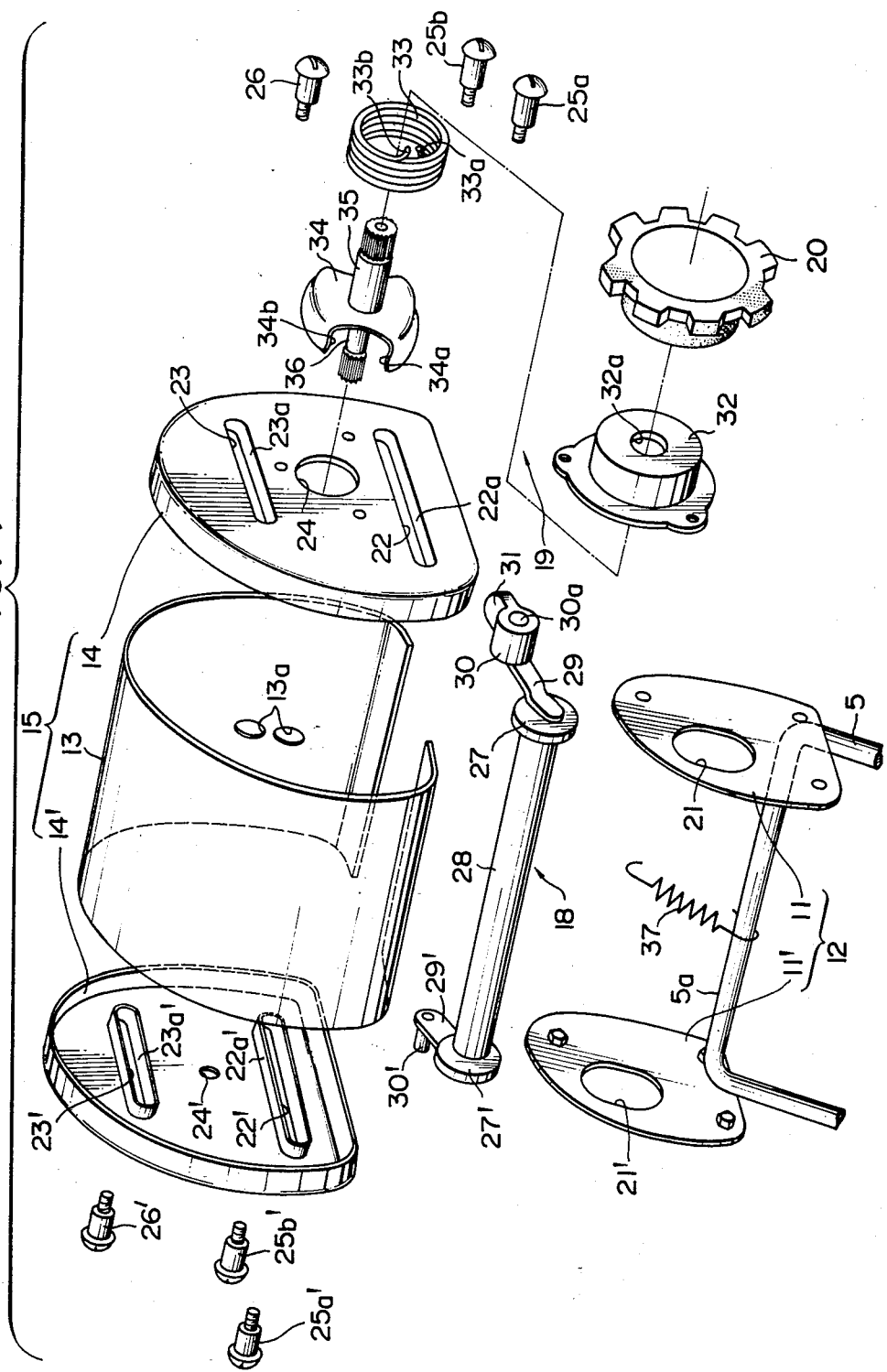
FIG. 4 is a perspective view of the headrest device of the invention, shown in an exploded, disassembled state.

The headrest device 3 in accordance with the preferred embodiment of the invention will now be described in more detail with reference to FIGS. 2 to 4. The headrest body 4 comprises a stationary frame portion 12 which includes a pair of stationary plates 11 and 11' fixedly secured to the stay 5, and a movable frame portion which includes a pair of side panels 14 and 14' adapted to be fitted to the opposite side end parts of a central panel 13 which has a horseshoe-shaped cross sectional configuration. As is apparent from the drawings, the movable frame portion 15 is surrounded by a cushion material 16 (such as a foamed plastic) around the whole periphery thereof, and the latter is covered with an outer surface material 17. The pair of plates 11 and 11', which constitute the stationary frame portion 12, are formed with engageable holes 21 and 21', whereas the pair of side panels 14 and 14' included in the movable frame portion 15 are formed with horizontally-extending upper guide grooves 23 and 23' and lower guide grooves 22 and 22'. The upper and lower guide grooves of each side panel are spaced apart a predetermined distance. A shaft hole 24 which has a larger diameter is formed at a point between the upper guide groove 23 and the lower guide groove 22 on the side panel 14, whereas a shaft hole 24' having a smaller diameter is formed at a corresponding point between the upper guide groove 23' and the lower guide groove 22' on the other side panel 14'. The guide grooves 22, 22', 23 and 23' have inwardly projecting rims $22_a$, $22_a'$, $23_a$ and $23_a'$ extending around the inside periphery thereof, respectively, so that they receive pins $25_a$, $25_b$, $25_a'$, $25_b'$ and pins 26 and 26' extending therethrough, the pins $25_a$, $25_b$, $25_a'$, $25_b'$, 26 and 26' projecting from the plates 11 and 11' of the stationary frame portion 12. Specifically, the pins $25_a$, $25_b$, $25_a'$ and $25_b'$, which are adapted to be engaged in the lower guide grooves 22 and 22', are located on the plates 11 and 11' by a distance substantially equal to a half of the length of the lower guide grooves 22 and 22', whereas the pins 26 and 26', which are adapted to be engaged in the upper guide grooves 23 and 23', are located above the point intermediate the pins $25_a$ and $25_b$ and $25_a'$ and $25_b'$ on the plates 11 and 11'. Thus, the movable frame portion 15 is displaceable forward or backward along a straight line whose orientation is fixed relative to the stationary frame portion 12 by way of engagement of the pins $25_a$, $25_b$, $25_a'$ and $25_b'$ in the guide grooves 22, 22', 23 and 23'.

Further, an eccentric cam mechanism 18 is disposed between the stationary frame portion 12 and the movable frame portion 15, which, as noted above, are operatively associated with one another in such a manner that the latter is displaceable forward or backward along a straight line whose orientation is fixed relative to the former, the eccentric cam mechanism 18 being adapted to turn by means of a combination of a braking mechanism 19 and a knob 20 disposed on one side of the movable frame portion 15.

Specifically, the eccentric cam mechanism 18 is constructed such that a pair of disc element 27 and 27' adapted to be engaged in the vertically-extending engageable holes 21 and 21' on the plates 11 and 11' of the stationary frame portion 12 are fixed to both the side ends of a connecting tube 28 and have arms 29 and 29' attached thereto, the arm 29 fixedly carrying a boss 30 at its free end, which is adapted to be fitted into the hole 24 having the larger diameter in the side panel 14 of the movable frame portion 15, and the arm 29' carrying a pin 30' at its free end, which is adapted to be fitted into the hole 24' having the smaller diameter in the other side panel 14' of the movable frame portion 15. The eccentric cam mechanism 18 is thus pivotally supported by means of the movable frame portion 15. It should be noted that the boss 30 on the eccentric cam mechanism 18 includes an engagement projection 31 adapted to be operatively connected to the braking mechanism 19.

The braking mechanism 19 essentially comprises a cylindrical outer case 32, a coil spring 33 tightly fitted into the outer case 32, the coil spring 33 having engagement portions $33_a$ and $33_b$ at its opposite ends, and a cylindrical inner case 34 fitted into the coil spring 33, the inner case 34 being formed with engagement edges $34_a$ and $34_b$ in the form of a cutout corresponding to the engagement portions $33_a$ and $33_b$ of the coil spring 33 and including an actuating shaft 35 at the center of the outer side and an operating shaft 36 at the center of the inner side thereof. The actuating shaft 35 extends outwardly through a hole $32_a$ in the outer case 32 and the operating shaft 36, which is made integral with the actuating shaft 35 in alignment with the latter, extends inwardly from the inner case 34. Further, the outer case 32 of the braking mechanism 19 is fixedly secured to the side panel 14 of the movable frame portion 15, whereas the operating shaft 36 projecting inwardly from the inner case 34 is fitted into a hole $30_a$ in the boss 30 on the cam mechanism 18, while the engagement projection 31 projecting from the boss 30 is located at a position intermediate between the engagement portions $33_a$ and $33_b$ of the coil spring 33. The outermost end part of the actuating shaft 35 extending through the hole $32_a$ of the outer case 32 is capped with the knob 20.

The operation of the above-described headrest device will now be described. Assuming that the headrest body 4 is located just above the stay 5, that is, at a position along a line extending through the elongated dimension of the seat back 2, the disc elements 27 and 27' are engaged in the upper part of the vertically-extending engageable holes 21 and 21' in the plates 11 and 11' of the stationary frame portion 12, the arms 29 and 29' are located in the vertical direction relative to the pivotal support part of the movable frame portion 15 and the guide grooves 22, 22', 23 and 23' of the movable frame portion 15 are engaged to the pins $25_a$, $25_b$, $25_a'$ and $25_b'$ as well as 26 and 26' projecting from the plates 11 and 11' of the stationary frame portion 12 at the middle part thereof. At this moment the cam mechanism 18 is inhibited from turning by way of braking activity of the braking mechanism 19 whereby the movable frame portion 15 is immovably held relative to the stationary frame portion 12.

As the knob 20 is rotated in a clockwise direction as seen in the drawing, the actuating shaft 35 of the braking mechanism 19 is caused to rotate together with the inner case 34 until the engagement edge $34_a$ on the latter abuts against the engagement portion $33_a$ of the coil spring 33. As the knob 20 is rotated further, the coil spring 33 is contracted away from the inner wall surface of the outer case 32 and thereby the actuating shaft 35 becomes free to rotate. Since the actuating shaft 35 is made integral with the operating shaft 36, the latter is caused to rotate with the former whereby the arm 29 of the cam mechanism 18 is turned by way of the boss 30 so that the disc element 27 is turned downward together with the other disc element 27' about the pivotal support part of the arms 29 and 29' relative to the movable frame portion 15. Since turning movement of the cam mechanism 18 is identified with downward turning movement of the arms 29 and 29' defined by means of the engageable holes 21 and 21' on the stationary plates 11 and 11', that is, combined movement comprising forward movement of the pivotal support part of the arms 29 and 29' and downward movement of the disc elements 27 and 27' along the engageable holes 21 and 21', the movable frame portion 15 is thrusted forward by means of the pivotal shaft part of the arms 29 and 29' whereby it is caused to move forward along a straight line due to its movement being defined by way of engagement of the pins $25_a$, $25_a'$, $25_b$ and $25_b'$ on the stationary plates 11 and 11' in the guide grooves 22, 22', 23 and 23' on the side panels 14 and 14'. When the cam mechanism 18 is turned until the arms 29 and 29' assume a horizontal posture, the disc elements 27 and 27' come into abutment against the lower end of the engageable holes 21 and 21' on the stationary plates 11 and 11' so that further turning movement is inhibited. Then, the movable frame portion 15 moves forward while the above-mentioned abutment is maintained until the position (as identified with real lines in FIG. 2).

Figure 2:
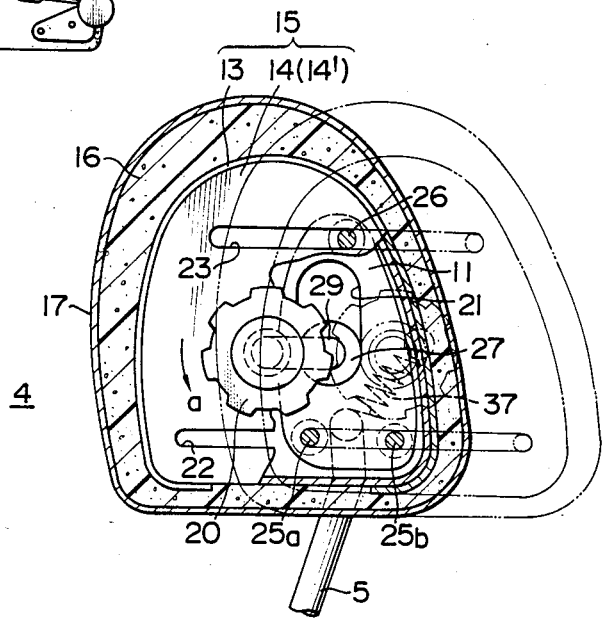
FIG. 2 is a sectional side view of the headrest device in accordance with a preferred embodiment of the invention.

Next, the knob 20 is rotated in a counterclockwise direction as seen in FIG. 2 (as identified by the arrow a), the cam mechanism 18 is caused to turn in the opposite direction to that in the foregoing by way of the braking mechanism 19, whereby the pivotal support part of the arms 29 and 29' are displaced backward while the disc elements 27 and 27' are displaced upward along the engageable holes 21 and 21' on the stationary plates 11 and 11'. As a result, the movable frame 15 is moved backward along a straight line. When the arms 29 and 29' of the cam mechanism 18 are turned backward until they resume the horizontal posture, the movable frame portion 15 reaches its rearmost position (as identified with two dot-chain lines in FIG. 2).

If an operator interrupts rotation of the knob 20 during forward or backward movement of the movable frame portion 15, the coil spring 33 in the braking mechanism 19 is released from thrusting caused by the inner case 34 and thereby the original position is restored whereby it is brought in pressure contact with the inside wall of the outer case 32 again. As a result, the cam mechanism 18 is inhibited from further turning and the movable frame portion 15 stops its movement at this position. When the cam mechanism 18 is subjected to unexpected turning force by way of the movable frame portion 15 for some reason while the above-mentioned position is maintained, the engagement projection 31 on the boss 30 comes in abutment against the engagement portion $33_a$ or $33_b$ of the coil spring 33 corresponding to the direction of application of the turning force and thereby the coil spring 33 is caused to expand further, resulting in increased frictional force exerted on the outer case 32. Thus, the cam mechanism 18 is inhibited from any further turning movement and the movable frame 15 continues to hold its position.

As described above, the movable frame portion 15 is movable forward or backward along a straight line whose orientation is fixed with respect to the stationary frame portion 12 and moreover it can be held immobile midway along the length of its movement. As a result, the position of the movable frame portion 15 can be adjusted in a forward or backward direction relative to that of the stationary frame portion 12. Namely, the position of the headrest body 4 can be adjusted in a forward or backward direction relative to that of the seat back 2.

During the above-mentioned movement of the movable frame portion 15, it has been found that an appreciable extent of idle movement is caused in the braking mechanism 19 in the opposite direction to that of the movable frame portion 15. To prevent occurrence of the idle movement, the stationary frame portion 12 is operatively connected to the movable frame portion 15 by means of a coil spring 37 so that the latter is normally pulled toward the former. Namely, the coil spring 37 is spanned under tension between a connecting rod $5_a$ of the stay 5 and engagement holes $13_a$ on the central panel 13 of the stationary frame portion 12, the connecting rod $5_a$ extending between both the plates 11 and 11' of the stationary frame portion 12. Due to the arrangement of the coil spring 37, there is a need to apply to the movable frame portion 15 manual force appreciably higher than that during movement in the direction of offset force caused by the coil spring 37 when the movable frame portion 15 is intended to move against the aforesaid offset force. However, in view of the fact that the coil spring 37 serves merely to eliminate idle movement, the aforesaid offset force is determined to such a level as to accomplish the intended object of the coil spring 37 and therefore the existence of the latter causes little hindrance to movement of the movable frame portion 15.

The extent of forward or backward movement of the movable frame portion 15 can be changed by changing the length of the arms 29 and 29' of the cam mechanism 18, that is, by changing the displacement of the cam.

Further, the present invention should not be limited only to the braking mechanism 19 as illustrated in the accompanying drawings, but any other suitable braking mechanism may be employed which is constructed so as to lock the position of the headrest body where turning movement is interrupted.

In the illustrated embodiment the stay 5 is constructed such that it can be moved upwardly away from the seat back 2 or lowered toward the same in order to adjust the height of the headrest body 4, but this adjustment of the height does not form any part of the invention and thus will not be described in further detail.

As will be readily understood from the above description, the headrest device of the invention is constructed such that a movable frame portion is movable forward or backward along a straight line whose orientation is fixed with respect to a stationary frame portion of the headrest body and movement of the movable frame portion can be controlled with the aid of a combination of an eccentric cam mechanism and a braking mechanism. Thus, the headrest device can be steplessly displaced forward or backward along a straight line and the position of the headrest body can be properly determined in conformance with the geometrical configuration of the body of a driver as well as his physical preference. Since the headrest body is adapted to move forward or backward along a straight line, it is assured that the rear part of a driver's head is always brought into surface contact with the headrest body in a constant posture at any position during forward or backward movement with comfort. The driver will not feel a sense of incongruity each time the position of the headrest body is changed. Further, since the headrest device is equipped with a braking mechanism, it is assured that the position of the headrest body will remain unchanged even in the event of a shock imparted to the driver, and therefore his head is reliably held with high safety. Another characterizing feature of the invention is that the headrest device is provided with a combination of a simple eccentric cam mechanism and a conventional braking device without any use of complicated gear mechanism and therefore it is constructed with the reduced number of parts and components, resulting in easy assembling and inexpensive manufacturing costs.

What is claimed is:

1. A headrest device which is mountable to a stay means extending from the top of a backrest of a vehicle seat, said headrest comprising the following elements, the terms vertical, horizontal, upper and lower being used on the assumption that the headrest is attached to the stay means extending from the backrest of the vehicle seat when the backrest is in its essentially vertical orientation, a stationary frame portion, said stationary frame portion including (a) first and second spaced apart plates fixedly attachable to said stay means so as to be vertically oriented, said first and second plates having corresponding elongated openings therein whose elongated dimensions are vertically oriented and said first and second plates defining facing inner sides and non-facing outer sides, and (b) at least one upper guide projection and at least one lower guide projection extending away from the outer sides of each of the first and second plates from respective points above and below the elongated openings therein, a movable frame portion, said movable frame portion including (a) first and second spaced apart side panels which are respectively positioned adjacent the outer sides of said first and second plates, each of said first and second side panels including a horizontal upper guide groove through which at least one upper guide projection from the associated plate extends, a horizontal lower guide groove through which at least one lower guide projection from the associated plate extends, and a hole located between the upper and lower guide grooves, and (b) a central panel extending between said first and second side panels, a braking mechanism, said braking mechanism including (a) an outer case fixedly secured to the first side panel of said movable frame portion so as to cover the hole therein, said outer case including an aperture therein and an inner peripheral surface, (b) an inner case rotatably positioned within said outer case, said inner case defining two engagement edges and including an operating shaft which projects toward the hole in said first end panel and an actuating shaft which extends through the aperture in said outer case, and (c) a coil spring positioned between said inner case and said outer case, said coil spring having engagement portions at its opposite ends which are adapted to contact a corresponding engagement edge of said inner case so as to allow the coil spring to be brought in pressure contact with the inner peripheral surface of said outer case, and an eccentric cam mechanism which is capable of moving said movable frame portion forward and backward with respect to said stationary frame portion, said eccentric cam mechanism including (a) first and second disc elements which are respectively located within the elongated openings in said first and second plates, (b) a connecting tube extending between said first and second disc elements, (c) a first support arm connected to said first disc element, said first support arm including a base which is rotatably positioned in the hole in said first panel, and (d) a second support arm connected to said second disc and having a free end which is rotatably positioned in the hole in said second side panel.

2. The headrest device as defined in claim 1, wherein said actuating shaft of said braking mechanism has a free end outside of said outer case, and wherein a knob is attached to said free end of said actuating shaft.

3. The headrest device as defined in claim 1, wherein said central panel of said movable frame portion has a horseshoe-shaped cross section and defines an inner surface and an outer surface, and wherein a cushion material is attached to said outer surface of said central panel.

4. The headrest device as defined in claim 1, wherein each of said first and second plates of said stationary frame portion includes only one upper guide projection extending away therefrom.

5. The headrest device as defined in claim 4, wherein each of said first and second plates of said stationary frame portion includes only two lower guide projections extending away therefrom, said lower guide projections being horizontally spaced apart, and said upper guide projection being located above the halfway point between the two associated lower guide projections.

6. The headrest device as defined in claim 5, wherein each of said upper and lower guide projections comprise pins threadingly engaged in the respective first and second plates.

7. The headrest device as defined in claim 1, including a spring which is attached at one end to said central panel of said movable frame means, its other end being attachable to said stay means.

8. The headrest device as defined in claim 1, wherein said connecting tube of said eccentric cam mechanism defines a first axis therethrough, wherein the free end of said second support arm of said eccentric cam mechanism includes a pin which is rotatably positioned in the hole in said second side panel of said movable frame means, and wherein said pin of said second support arm and said boss of said first support arm define a second axis which is parallel to but not coincident with said first axis.

* * * * *